Aug. 22, 1967  W. T. APPLEBERRY  3,337,244
HERMAPHRODITE COUPLING
Filed June 24, 1964  2 Sheets-Sheet 1

INVENTOR.
WALTER T. APPLEBERRY
BY
Leon D. Rosen
ATTORNEY.

Aug. 22, 1967

W. T. APPLEBERRY 3,337,244

HERMAPHRODITE COUPLING

Filed June 24, 1964

INVENTOR.
WALTER T. APPLEBERRY
BY
Leon D. Rosen
-ATTORNEY-

United States Patent Office 3,337,244
Patented Aug. 22, 1967

3,337,244
HERMAPHRODITE COUPLING
Walter T. Appleberry, Long Beach, Calif., assignor, by mesne assignments, to McDonnell Douglas Corporation, Santa Monica, Calif., a corporation of Maryland
Filed June 24, 1964, Ser. No. 377,638
3 Claims. (Cl. 285—70)

This invention relates to quick connect and release couplings which are capable of mating with couplings identical with themselves, and more specifically to couplings which are convertible between a male and female configuration.

Most quick connect and release fluid couplings utilize a permanently male half which is received within a permanently female half to form a fluid-tight connection. Two male or two female members cannot be connected together and this can lead to undesirable situations. For example, in fire fighting applications heavy hoses are often connected together to carry water, and it is sometimes found, after the hoses are laid, that two male or two female couplings have been placed adjacent and, as a result, that all of the hoses on one side of that connection point must be picked up and reversed. A system wherein any coupling can be connected to any other coupling would eliminate these problems.

Attempts have been made to design quick connect and release coupling system wherein any coupling could be connected to any other. One approach utilizes identical coupling halves having face seals which press against each other to form a fluid seal when the couplings are locked together by interleaving finger-like members. Face sealing generally results in leakage inasmuch as internal fluid pressure tends to push apart the coupling halves thereby separating the face seals and causing leakage. Another approach uses two male couplings and a detachable sleeve which fits over both couplings to connect them. However, the detachable sleeve may be removed and be unavailable when needed to make a connection.

This invention employs quick connect and release couplings which may be quickly converted between a male and a female configuration. Thus, if both couplings of a set are in a male or a female configuration, they may be connected by converting one of the couplings to the other sex. Inasmuch as a male-to-female connection is thereby obtained, the advantages of this form of connection, including the employment of O-ring sealing, may be secured.

One embodiment of this invention employs only the O-ring seals of the coupling in the female configuration to effect fluid sealing between two matings couplings. This characteristic enables a change of seals by converting each of the mating couplings to their other sex so that only the seals of the new female coupling are employed. This feature is of particular importance because a defective seal is usually discovered only when the coupling is used, and there may be no time to make a change of seals or there may not be a new seal readily available.

The couplings of this invention are easily connected together and easily converted from one sex or configuration to the other without any tools and in a few seconds. In one embodiment of the invention to be described herein, two couplings are connected and securely locked together merely by inserting a piston of the male coupling into a cylinder of the female coupling and pushing the couplings together. Disconnection is accomplished by pulling the female sleeve.

The couplings of this invention readily utilize poppet valves which automatically open and enable the flow of fluid between the couplings as they are connected. The arrangement of the O-ring seals is such that the couplings are fluid-tight sealed togther before opening of the poppet valves, thereby preventing the spilling of fluid.

These and other features of the invention and a fuller understanding thereof may be had by reference to the following description and claims taken in conjunction with the accompanying drawings in which:

Figure 1:
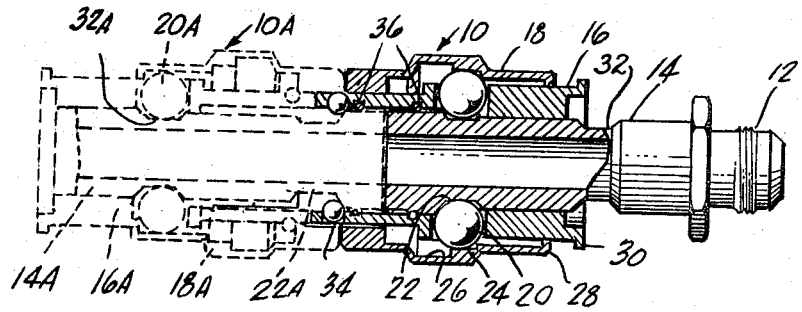
FIGURE 1 is a sectional, side elevation view of a simplified coupling constructed in accordance with the invention, shown in a female configuration and connected to an identical coupling, shown in phantom lines, which is in a male configuration.

We refer now to FIG. 1 which shows a simplified embodiment of a coupling 10 constructed in accordance with the invention and its manner of connection to an identical coupling 10A shown in phantom. The coupling 10 is in a female configuration so that it readily receives the couplings 10A which is in a male configuration.

The coupling 10 comprises a fitting 12 of the usual type for connecting it to a hose or other fluid carrying member. A hollow piston 14 fixed to the fitting carries fluid to the other coupling 10A. A cylinder 16 surrounding the piston 14 serves as a female receiving member to enable the coupling 10 to connect to and hold the piston 14A of the male coupling 10A. A sleeve 18 surrounding the cylinder 16 serves to hold the cylinder and piston in whatever configuration, male or female, is desired.

The sleeve 18 holds the coupling 10 in the female configuration shown in FIG. 1 by means of one or more locking balls 20. Generally two balls are utilized to distribute the load evenly. The balls 20 lie in holes in the cylinder 16, but project into a groove 22 of the piston 14 to hold the piston in place. A ledge 24 formed on the sleeve 18 is in contact with the balls and prevents their withdrawal from the groove 22.

The coupling 10 is transformed to the male configuration by pulling pack on the sleeve 18. The backward or rearward position is herein defined as the direction of movement which brings a part closer to the fitting 12 of the same coupling. Pulling back on the sleeve 18 enables the balls 20 to move radially outwardly into the groove 26 in the sleeve and withdraw from the groove 22 of the piston, thereby disengaging the piston 14 and cylinder 16. Pulling back or rearwardly even further on the sleeve 18 causes a rim 28 thereon to push against a rim 30 on the cylinder, and the cylinder 16 and sleeve 18 move rearwardly together until the locking balls 20 engage groove 32 thereby preventing further movement of the cylinder 16 and sleeve 18. Moving the cylinder rearwardly causes the piston 14 to project forward of the coupling and the coupling is then in a male configuration as shown at 10A in FIG. 1.

The coupling 10A is locked in a male configuration by the engagement of the locking balls 20A in back groove 32A. In this position, the piston 14A is locked in a projecting state.

The engagement of a female and male coupling is accomplished by inserting the piston 14A into the cylinder 16 far enough that coupling balls 34 of the cylinder engage the groove 22A. The sleeve 18A of the male coupling surrounds the balls 34 and prevents their withdrawal from the groove 22A. Two O-rings 36 of the female coupling 10 seal the connection and prevent leakage of fluid.

Figure 2:
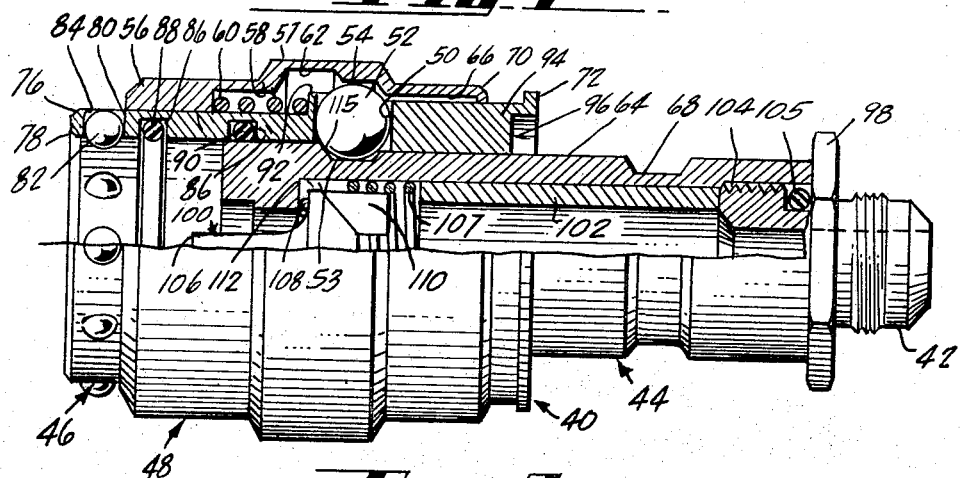
FIG. 2 is a partially sectional side elevation view of another embodiment of the invention shown in a female configuration.

We refer now to FIG. 2 which shows a quick connect and disconnect coupling 40 constructed in accordance with the invention, in a female configuration. This coupling is similar in basic operation to the previously described couplings and includes similar parts serving similar functions. It includes a fitting 42 for connecting the coupling to a hose or the like, a piston 44 for carrying fluid, a cylinder 46 serving as a female receiving member, and a sleeve 48 for holding the coupling in a male or female configuration. The cylinder 46 includes two holes 50 positioned on diametrically opposite sides of the cylinder and extending through the cylinder walls, for receiving locking balls 52. A forward groove 53 formed in the piston receives the balls 52 and prevents relative sliding of the piston and cylinder. A ledge 54 formed on the sleeve keeps the balls 52 locked in the groove 53.

The sleeve 48 has a forward portion 56 which engages the cylinder 46 in a sliding fit. The center of the sleeve includes a stepped groove on its inside and a raised ring portion 57 on its outside. A first groove portion 58 of the stepped groove is adapted to receive a helical spring 60. A second groove portion 62 is of sufficient diameter that the balls 52 can fit between a center portion 64 of the piston and the bottom of the second groove portion 62. The ledge 54 of the stepped groove is of sufficient diameter that the balls 52 can lie between it and the bottom of the forward piston groove 53. The inside diameter of the rearward portion 66 of the sleeve is sufficient to hold the balls 52 between it and the bottom of a rearward groove 68 of the piston. An inwardly extending rim 70 is formed on the rearward portion of the sleeve to hold the balls 52 and to push against a rim 72 on the cylinder, as will be set forth later in this description.

The cylinder 46 has a forward end adapted to receive a piston of another mating coupling. An outer bevel 76 and inner bevel 78 are formed at the forward cylinder end to facilitate the reception of the sleeve and piston of the mating coupling. A plurality of radially extending holes 80 formed in the forward end portion of the cylinder 46 and extending therethrough serve to hold coupling balls 82. The holes 80 are somewhat conical in shape at their radially inner portions, to prevent the balls 82 from passing inwardly completely through the cylinder and dropping out. The balls are prevented from falling out of the larger end of the holes 80 by performing the operation of staking on the outer walls of the holes to form lips 84.

The O-ring retainer grooves 86 are formed on the inside of cylinder 46. A forward O-ring 88 and rearward O-ring 90 are positioned in the grooves. When the coupling is in a female configuration shown in FIG. 2, the forward O-ring 88 serves to fit over the piston of the mating coupling while the rearward O-ring 90 fits over the forward end of the piston 44. The O-rings of the female coupling thus serve to seal the connection of the two pistons and prevent leakage of the fluid flowing between them.

The center portion of the cylinder 46 forms a step 92 which holds an end of the spring 60. The rearward portion 94 of the cylinder is generally thicker than the forward portion, and it fits between the rim 70 on the sleeve and the center portion 64 of the piston. A groove 96 formed on the rearward end of the cylinder serves to receive the flange 98 on the fitting 42 when the coupling is a male configuration.

The piston 44 has a pasageway extending through its length. A poppet valve assembly 100 of the ordinary type is positioned in the passageway near the forward end of the piston. A spacer 102 extends longitudinally between the valve assembly 100 and the fitting 42 and holds the valve asembly in place. The spacer 102 is threadedly joined at 104 to the piston and O-ring 105 seals any space between them to prevent leakage of fluid.

The poppet valve assembly 100 includes a valve stem 106 which projects past the forward end of the piston and is held in that position by a coil spring 107. When the stem is pushed rearwardly, a sealing ring 108 thereon is held away from a stepped portion of the piston and fluid flows around the valve stem and out of the piston. The stem 106 is pushed inwardly by an identical stem of a coupling with which it is mating. Vanes 110 fixed to the stems may contact the spacer 102 to prevent the stems from being pushed in too far. This assures that the poppet valve of each soupling will fully open even if the forces of the springs 107 of the mating couplings are unequal. The amount of projection of the stem 106 from the end of the piston is small enough to assure that it will not contact the stem of the mating coupling until the piston of the mating coupling is engaged by the forward O-ring 88. This helps to prevent leakage of fluid as two couplings are being joined together and their poppet valves are being opened.

Figure 3:
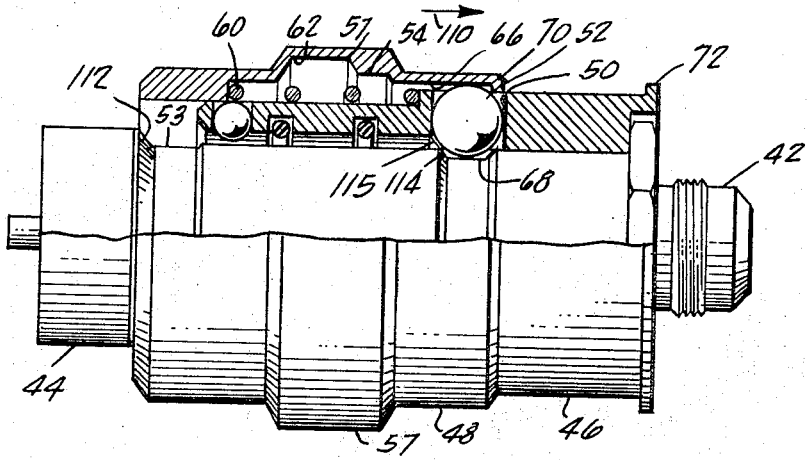
FIG. 3 is a partially sectional side elevational view of the embodiment of FIG. 2 in a male configuration.

When the coupling of FIG. 2 is converted to a male configuration, it appears as shown in FIG. 3. It can be appreciated from the figure that the balls 52 hold the coupling in the male configuration by lying in the rearward groove 68 of the piston and thereby holding the piston 44 projected from the cylinder 46. The backward portion 66 of the sleeve prevents retraction of the balls 52 from the piston groove, and the balls contact the rim 70 of the sleeve and prevent forward movement and removal of the sleeve.

The transformation of the coupling from the male configuration of FIG. 3 to the female configuration is accomplished by first grasping the fitting 42 or any hose it is attached to with one hand and grasping the ring portion 57 of the sleeve in the other hand. The ring portion 57 is pushed rearwardly in the direction of the arrow 110 until the rim 70 of the sleeve contacts the rim 72 of the cylinder. The balls 52 can then fall into the second groove portion 62 of the stepped groove of the sleeve. Both the sleeve 48 and the rim portion 72 of the cylinder are then grasped, as by the thumb and index finger of the operator's hand, and are moved forward in the direction opposite to the arrow 110. The forward ridge 114 of the backward groove 68 pushes the balls 52 out of the groove 68 and into the second groove portion 62 of the sleeve. The sleeve 48 and cylinder 46, with the balls 52 therein are then locked together and forward force need be applied to only one of them. When the balls 52 reach the forward groove 53 of the piston they drop into the groove 53, permitting the sleeve 48 to move forward. A ledge 115 on the inside of the cylinder contacts the forward side 112 of the groove 53 to prevent further forward movement of the cylinder relative to the piston. Further forward movement of the sleeve 48 under the force of the spring 60 causes the ledge 54 of the sleeve to engage the balls 52 and securely hold them in the groove 53. The coupling is now in the female configuration of FIG. 2.

The transformation of the coupling from the female configuration of FIG. 2 to the male configuration is accomplished by first grasping the fitting 42 and the ring portion 57 of the sleeve 48. The sleeve is pulled rearwardly while the fitting is held steady so that the rim 70 of the sleeve contacts the rim 72 of the cylinder and the balls 52 move out of the groove 54 and into the second groove portion 62 of the sleeve. The sleeve is further pulled rearwardly until the bottom of a depression 96 at the rearward end of the cylinder contacts the flange 98 of the fitting. The balls 52 will then lie in the backward groove 68 of the piston. The sleeve 48 is then pushed forward by spring force until the rim 70 of the sleeve contacts the balls 52 and is stopped by them. The coupling is then in the male configuration of FIG. 3.

A male and female coupling are connected by merely inserting the piston 44 of the male member into the cylinder 46 of the female member, until the locking balls 82 of the female member engage the forward groove 53 of the male member. The couplings are unlocked by pulling backward on the sleeves 48 of the couplings. When the sleeve of the male member is slid sufficiently rearwardly to uncover the coupling balls 82 of the female member the balls move out of the groove 54 of the male piston and the couplings can be pulled apart.

The assembly of the coupling of FIGS. 2 and 3 is accomplished by first placing the coupling balls 82 in the apertures 80 and staking the cylinder walls immediately surrounding the apertures to hold the balls in place. O-ring seals 88 and 90 are placed in the two grooves 86. The spring 60 is placed over the cylinder, and the sleeve 48 is slid over the spring and cylinder. The locking balls 52 are then inserted in the holes 50 from the inside of the cylinder and the cylinder and sleeve are slide over the piston from the rearward end of the piston. The spacer 102 with the poppet valve assembly 100 and flange 98 mounted thereon, is then screwed into the piston to complete the assembly. It may be noted that the sleeve 48 is prevented from moving forwardly too far by the locking balls 52 which engage to rim 70 of the sleeve. By this arrangement the locking balls serve dual purposes and eliminate the need for snap-rings, threaded fittings or other devices which might ordinarily be added merely to retain the sleeve.

One of the important features of the invention is the fact that only the set of O-rings 88 and 90 in the female coupling are used to effect sealing. If the O-rings of one coupling leaks, the O-rings of the other coupling can be used instead. This change is accomplished by transforming each coupling of the set to be mated to its other configuration and reconnecting them. Only the O-rings of the new female coupling are then used for sealing. This feature is of importance because leaks are generally discovered when the couplings must be used, and oftentimes it is then too late to replace leaky O-rings. One O-ring may be placed on the outside of each piston 44 to enable the easier cleaning of them instead of providing two O-rings on the inside of each cylinder, but then there would not be a spare set of O-rings to be used if leaks develop, and the O-rings would more likely be damaged because of their exposure.

Figure 4:
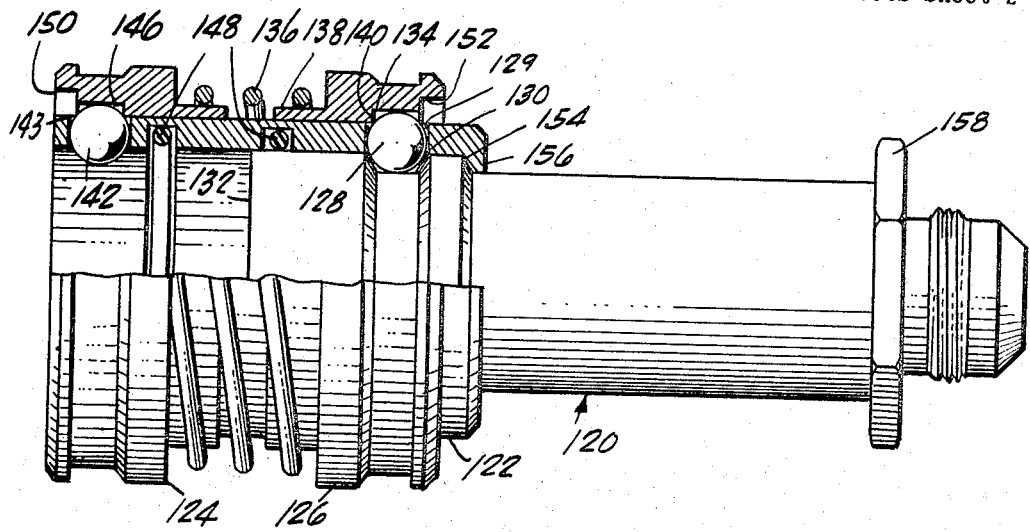
FIG. 4 is a partially sectional side elevation view of still another embodiment of the invention, shown in a female configuration.
Figure 5:
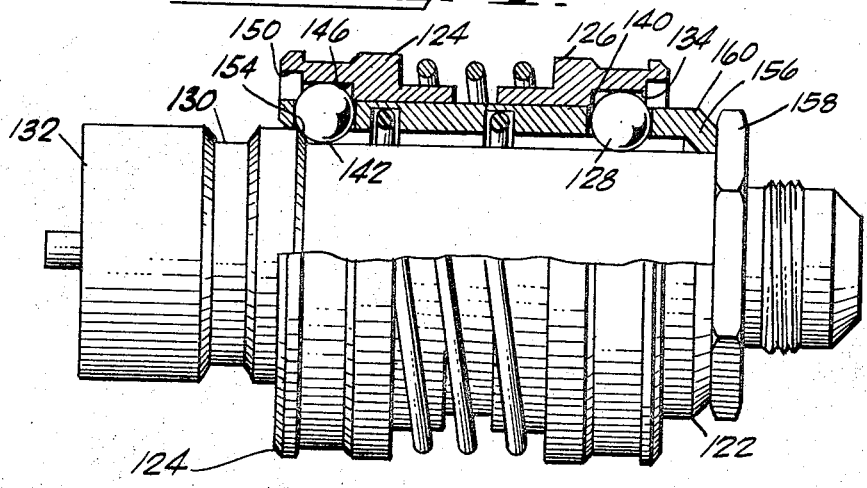
FIG. 5 is a partially sectional side elevation view of the coupling of FIG. 4 in a male configuration.

Another embodiment of the invention is shown in FIGS. 4 and 5. This embodiment is smaller and lighter than the embodiments of FIGS. 2 and 3, but is more complicated to operate. The embodiment of FIGS. 4 and 5 includes a piston 120, cylinder 122 and sleeves 124 and 126. The piston 120 has internal valve and spacer assemblies similar to the abovedescribed coupling. The external surface of the piston and the interactions of the other members are, however, different.

The coupling of FIG. 4 is held in its female configuration by locking balls 128 which lie in holes 129 formed in the cylinder and project into a forward groove 130 formed on the piston near the forward end 132 thereof. The balls are held in the forward groove 130 by a ledge 134 formed on the inside of the rearward sleeve 126. The sleeve 126 is biased rearwardly by a coil spring 136 which is held in a stepped portion 138 of the sleeve, the spring serving also to bias the forward sleeve 124 in a forward direction. An inner sleeve edge 140 positioned immediately forward of the ledge 134 contacts the balls 128 and prevents excessive rearward movement of the sleeve 126. The coupling is held in a male configuration shown in FIG. 5 by the contact of coupling balls 142 with a step 154 formed on the piston, and contact of rim 156 of the cylinder with a flange 158 fixed to the piston.

The male coupling of FIG. 5 is held connected to the female coupling of FIG. 4 by coupling balls 142. The balls 142 are prevented from falling through apertures 143 in the cylinder by making the apertures conical in shape at their radially inward portions. Even when the balls 142 are resting against the radially inward portions of the apertures 143, they protrude outwardly enough that they retain the forward sleeve 124 by preventing its sliding forward of the apertures 143. The balls 142 of the female coupling serve primarily to engage the male coupling with the female by engaging the forward groove 130 of the male piston. The balls 142 are held in the piston groove 130 by the ledge 146 of the forward sleeve 124 of the female coupling. The piston-to-cylinder sealing is accomplished by O-rings 148 in a manner similar to the sealing of the embodiments of FIGS. 2 and 3.

In order to connect two couplings together, the coupling balls 142 of the female cylinder must clear the connecting end 132 of the male piston. This is accomplished by pushing rearwardly on the forward sleeve 124 of the female coupling so that the ball receiving groove 150 of the forward sleeve is over the coupling balls 142. After the male piston is fully inserted into the female cylinder, the forward sleeve 124 is released, so that it moves forward under the force of the spring 136 and the ledge 146 locks the coupling balls 142 into the piston groove 130. Release of the couplings is accomplished by drawing rearwardly on the forward ring 124 of the female coupling and pulling the couplings apart.

The conversion from the female configuration of FIG. 4 to the male configuration of FIG. 5 is accomplished by first pushing the rearward sleeve 126 forward until the ledge 134 thereon clears the locking balls 128 and they can retract from the groove 130 and move into a receiving groove 152 on the rearward sleeve. While the locking balls 128 are so retracted, the forward end of the cylinder 122 is held steady while the piston 120 is pushed forward sufficiently for the locking balls 128 to clear the step 154 of the piston and settle in the rearward portions 156 of the piston. The rearward portion 156 is of sufficiently small diameter to permit the balls 128 to lie between it and the ledge 134. Once the locking balls 128 clear the step 154, the rearward sleeve 126 may be released. The forward sleeve 124 is then pushed rearwardly so that the coupling balls 142 can move into the ball receiving groove 150 of the forward sleeve. Further rearward force on the forward sleeve 124 moves it and the cylinder 122 toward the rearward portions of the piston. When the rim 156 of the cylinder contacts the flange 158 at the rearward end of the piston, the forward sleeve 124 is released to enable the ledge 146 thereon to engage the coupling balls 142 and hold them in the rearward portion of the piston. As shown in FIG. 5, the balls 142 abut the step 154 of the piston and hold the coupling in the male position.

The conversion of the male coupling of FIG. 5 to the female coupling of FIG. 4 is accomplished essentially by an order of steps which is the reverse of the female-to-male conversion. The forward sleeve 124 is pulled rearwardly until the coupling balls 142 move into the ball receiving groove 150 of the forward sleeve. While the forward sleeve 124 is thus held, the cylinder 122 is grasped, as about its rearward portion 160 and moved forward while the piston 120 is held steady as by holding the flange 158. Once the coupling balls 142 clear the forward end 132 of the piston, only the rearward sleeve 126 is grasped in the hand and pulled forward while the piston is held steady. When the forward movement of the cylinder 122 is stopped by the abutment of the rim 156 with the stop 154 of the piston, the forward sleeve 126 is released. The sleeve edge 140 then pushes the locking balls 128 into the piston groove 130 to lock the cylinder and piston together in the female configuration of FIG. 4.

The assembly of the coupling of FIGS. 4 and 5 is accomplished by first placing the O-ring seals 148 in the internal O-ring grooves of the cylinder. The coupling balls 142 are then placed in the apertures at the forward part of the cylinder. The forward sleeve 124, the spring 136, and the rearward sleeve 126 are slid over the cylinder. The locking balls 128 are then inserted in the holes 129 and, while the rearward sleeve 126 is pushed forwardly, the cylinder is slid over the piston 122 to the position of FIG. 5. The flange 158 with an internal spacer similar to the spacer 102 of FIG. 2, is then installed to complete the assembly.

The embodiment of FIGS. 4 and 5 have the advantage of utilizing a limited number of different parts inasmuch as the coupling and locking balls 142 and 128 may be identical and the sleeves 124 and 126 may also be identical. Furthermore, the sleeves 124 and 126 are relatively simple as compared to the sleeve of the embodiment of FIGS. 2 and 3 which have several hard-to-form, internal grooves. One disadvantage of the embodiment of FIGS. 4 and 5 is that in joining two couplings together, the forward sleeve 124 of the female coupling must be pulled rearwardly. In the coupling of FIGS. 2 and 3, the couplings automatically lock when pushed together.

While two different embodiments of the invention have been shown, many other embodiments may be constructed utilizing all or only some of the inventive features shown and described. For example, two couplings may be held together by interlocking fingers instead of the coupling balls shown; or the various internal groove portions of the sleeve such as the portions 54, 62 and 66 of FIGS. 2 and 3 may lie on the same circle, each groove portion subtending only a fraction of a whole circle and the sleeve being turned instead of longitudinally slid to operate the coupling. Accordingly, while particular embodiments of the invention have been shown and described, it is desired to emphasize the fact that many additional embodiments may be resorted to in a manner limited only by a just interpretation of the following claims.

I claim:
1. A coupling comprising:
   a cylindrically shaped piston having a forward end of a first diameter for connection to another coupling an a rearward end for connection to a fluid source, said piston having a passageway extending therethrough;
      said piston having a forward groove with a base portion of a given diameter formed a distance rearwardly spaced from said forward end,
      a center piston portion extending rearwardly from said forward groove and having a diameter intermediate said first diameter of said forward end of the piston and said base diameter of said forward groove, and
      a rearward groove portion extending rearwardly of said center piston portion and having a base diameter smaller than the base diameter of said forward groove;
   a cylinder slidably mounted about said piston, having a forward end portion with an internal diameter approximately equal to said first diameter of said piston and a rearward end;
      a plurality of coupling holes formed radially through said cylinder near said forward end thereof for holding coupling elements,
      a first internal seal-ring groove formed on said cylinder rearwardly of said coupling holes for holding a first seal-ring,
      a second internal seal-ring grooove formed on said cylinder rearwardly of said first internal groove for holding a second seal-ring;
      an outer step portion formed on the outside of said cylinder for holding the end of a coil spring,
      at least one locking ball hole formed radially through said cylinder at a position thereof spaced rearwardly of said step portion for holding at least one locking ball therein, and
      a cylinder rim formed on the rearward portion of said cylinder extending radially outwardly;
   a sleeve slidably mounted about said cylinder, having a forward end portion and a rearward end portion, said sleeve forward end portion in contact with said cylinder;
      a spring receiving groove formed in said sleeve for receiving a spring,
      an inner receiving groove formed rearwardly of said first groove portion,
      an inner ledge portion formed rearwardly of said receiving groove portion and having an inner diameter smaller than the inner diameter of said receiving groove,
      an inner rearward portion of said sleeve extending rearwardly of said inner ledge portion and having an inner diameter smaller than the inner diameter of said ledge portion, and
      an inwardly extending sleeve rim formed on the rearward end portion of said sleeve having an inner dimension smaller than said inner rearward portion and smaller than the outer diameter of said cylinder rim whereby to contact said cylinder rim and push it rearwardly;
   a plurality of coupling elements larger than the thickness of the walls of said cylinder about said holes, positioned in said hole;
   crimping means at the bottom and top of said coupling holes in said cylinder for retaining said elements therein;
   a seal-ring in each of said internal seal-ring groove in said cylinder;
   at least one locking ball positioned in said locking ball hole of said cylinder and having a diameter greater than the thickness of said cylinder walls adjacent said hole;
   said sleeve slidable axially with respect to said piston, and the radial distance between the base of said forward groove of said piston and said inner ledge portion of said sleeve being approximately equal to the diameter of said locking ball, the radial distance between said center piston portion and said inner receiving groove of said sleeve being approximately equal to the diameter of said locking ball, and the radial distance between said rearward groove portion of said piston and said inner rearward portion of said sleeve approximately equal to the diameter of said locking ball; and
   a spring disposed at least partly within said spring receiving portion of said sleeve and having an end portion abutting said outer step portion of said cylinder.

2. A coupling comprising:
   two substantially identically constructed coupling units, each unit being capable of assuming a male and female configuration, a combined male and female unit being capable of forming a fluid tight connector;
   each of said units having a one-piece cylindrically shaped piston having a forward end for connection to another unit and a rearward end for connection to a fluid source, said piston having a passageway extending therethrough for passage of fluid, said piston having a locking means on its exterior surface, said locking means comprising first and second spaced annular grooves, said first annular groove being of a lesser depth than said second annular groove;
   a cylinder concentrically disposed about said piston, a first locking element being supported within said cylinder, said first locking element being coactable with said spaced annular grooves of said locking means;
   a sleeve assembly coaxially disposed about said cylinder and longitudinally movable between a first and second position, a single spring means being held between said cylinder and said sleeve assembly biasing said sleeve assembly to rest in said first position, said sleeve assembly having a stepped configuration defining a portion of its inner surface which cooperates with said first locking element, said stepped configuration including at least three sections of progressively increasing diameter, so that when said first locking element engages an intermediate diameter section of said stepped portion said first locking element is received within said first annular groove of said locking means causing the coupling to assume the female configuration, and when said first locking element engages the smallest diameter section of said stepped portion said first locking element is received within said second annular groove of said locking means causing the coupling to assume the male configuration, the largest diameter section of said stepped portion receiving said first locking element to permit axial movement of said piston between said female and male configurations relative to said first locking element; and a second locking element being supported within said cylinder, said second locking element adapted to cooperate with the locking means of the other coupling unit of said coupling thereby effecting retention of the coupling units into a fluid tight connection.

3. A coupling as defined in claim 2 wherein:
said first and second locking element each comprise a plurality of balls.

References Cited

UNITED STATES PATENTS

| 2,512,999 | 6/1950 | Bruning | 137—614.04 |
| 2,689,143 | 9/1954 | Scheiwer | 285—316 |
| 2,736,578 | 2/1956 | Rafferty | 285—277 |
| 3,168,335 | 2/1965 | Sumption | 285—70 |
| 3,215,161 | 11/1965 | Goodwin et al. | 137—614.04 |

CARL W. TOMLIN, *Primary Examiner.*

THOMAS F. CALLAGHAN, *Examiner.*

R. S. BRITTS, *Assistant Examiner.*